F. J. SPUHLER.
BRACKET.
APPLICATION FILED JULY 22, 1914.
1,149,963.
Patented Aug. 10, 1915.
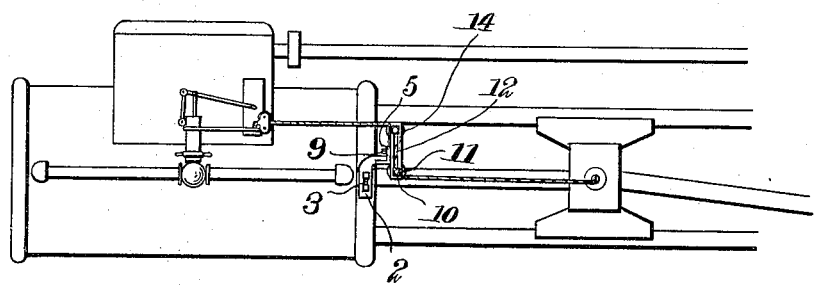
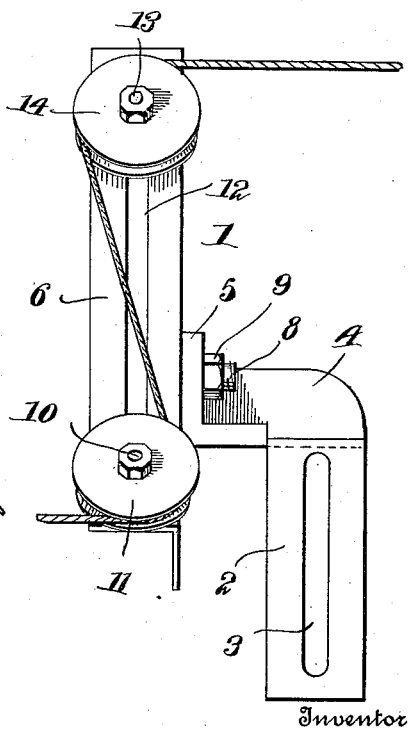
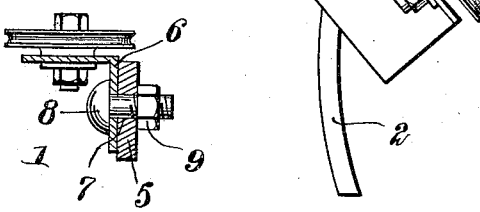
Witnesses
Frederick W. Ely.
John J. McCarthy
Inventor
F. J. Spuhler,
By Victor J. Evans
Attorney

UNITED STATES PATENT OFFICE.

FRANK J. SPUHLER, OF TUCUMCARI, NEW MEXICO.

BRACKET.

1,149,963.

Specification of Letters Patent.    Patented Aug. 10, 1915.

Application filed July 22, 1914. Serial No. 852,511.

*To all whom it may concern:*

Be it known that I, FRANK J. SPUHLER, a citizen of the United States, residing at Tucumcari, in the county of Quay and State of New Mexico, have invented new and useful Improvements in Brackets, of which the following is a specification.

This invention relates to improvements in brackets and has particular application to an adjustable bracket for carrying the cord of an engine indicator from the indicator drum or reducing motion to the cross head or other part connected to the engine piston.

In carrying out the present invention, it is my purpose to provide a bracket of the class described whereby the cord running from the indicator drum or reducing motion to the cross head or other part connected to the engine piston will be effectively carried or supported so that the same may move back and forth in the reciprocation of the cross head with a minimum amount of friction and whereby the various runs of the cord will be held in alinement with the drum and cross head respectively.

Furthermore, I aim to provide a bracket of the type set forth which will be adjustable and which may be readily and quickly applied to the engine and removed therefrom when desired, irrespective of the operation of the engine.

With the above and other objects in view, the invention consists in the construction, combination and arrangement of parts hereinafter set forth in and falling within the scope of the claims.

In the accompanying drawing; Figure 1 is a view in side elevation of a reciprocating engine equipped with a bracket constructed in accordance with the present invention. Fig. 2 is a view in elevation of the bracket. Fig. 3 is a similar view taken at right angles to Fig. 2. Fig. 4 is a cross sectional view through the bracket.

Referring now to the drawing in detail, 1 designates my improved bracket as an entirety, such bracket comprising a supporting strap 2 formed with an elongated slot 3 adjacent to one end thereof and having the opposite end bent at right angles to itself as at 4 and formed with an ear 5 upstanding from one edge of such bent portion.

6 designates an arm which, in the present instance, is substantially right angular in cross section. One of the flanges of the right angular arm 6 is formed with a longitudinally extending slot 7 adapted to register with an aperture formed in the ear 5 and through the registering slot 7 and the aperture in the ear 5 is passed a headed pivot bolt 8 equipped with a nut 9 whereby the bolt may be tightened and loosened. Projecting outwardly from the remaining limb of the arm 6 adjacent to one end thereof is a stud 10 upon which is rotatably mounted a sheave wheel 11, while formed in the last-mentioned flange of the arm 6 adjacent to the opposite end thereof is an elongated slot 12 through which is passed a stud 13 carrying a sheave wheel 14 and adjustable longitudinally within the slot 12 so that the distance between the sheave wheels may be varied.

In practice, a securing stud is passed through the slot 3 in the strap 2 and the latter fastened to a suitable support on or adjacent to the engine in proximity to the piston rod and adjusted vertically to the desired position. The nut 9 is now loosened and the arm 6 adjusted so that the bottom wall of the groove in the sheave wheel 11 will aline with the point on the cross head or other element to which the indicator cord is to be connected. The stud 13 is now moved within the slot 12 until the top of the sheave wheel 14 alines with the indicator drum or reducing motion. One end of the indicator cord is now fastened to the cross head or other moving part and the opposite end thereof trained over the sheave wheels 11 and 14, as illustrated in Fig. 1 of the drawing, and connected with the indicator drum or reducing motion.

From the foregoing description taken in connection with the accompanying drawing, the construction, mode of operation and manner of employing my improved bracket will be readily apparent. It will be seen that I have provided a bracket wherein the component parts are relatively adjustable and whereby the indicator cord is supported effectively and permitted to move back and forth with the piston of the engine with the minimum friction whereby the indicator will be actuated in the usual well known manner.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. A bracket of the class described comprising a supporting strap, an arm angular in cross section and having one of the flanges thereof formed with a longitudinally extending slot, a bolt passed through said slot and adjustably connecting said arm to said strap, a sheave wheel rotatably mounted upon the other flange of said arm adjacent to one end thereof, and a sheave wheel adjustably mounted upon the last-mentioned flange at the opposite end thereof.

2. A bracket of the class described comprising a supporting strap having one end portion bent at an angle to itself and formed with a connecting ear provided with an opening, an arm angular in cross section and having one limb thereof formed with an elongated slot adapted to register with the opening in said ear, a bolt passed through said slot and opening, a stud fixed upon the remaining flange of said arm adjacent to one end thereof, a sheave wheel rotatably mounted upon said stud, a stud adjustably mounted upon the last-mentioned flange of said arm at the opposite end thereof, and a sheave wheel carried by said last-mentioned stud.

3. A bracket of the class described comprising a supporting strap having one end portion bent at an angle to itself and formed with a connecting ear provided with an opening, an arm angular in cross section and having one limb thereof formed with an elongated slot adapted to register with the opening in said ear, a bolt passed through said slot and opening, a stud fixed upon the remaining flange of said arm adjacent to one end thereof, a sheave wheel rotatably mounted upon said stud, said last-mentioned flange being formed with an elongated slot, a stud adjustably mounted in said slot, and a sheave wheel carried by said last stud.

In testimony whereof I affix my signature in presence of witnesses.

FRANK J. SPUHLER.

Witnesses:
 MYRON B. KEATOR,
 HENRY SWAN,
 PHILLIP SHOHAN.

Copies of this patent may be obtained for five cents each, by addressing the "Commissioner of Patents, Washington, D. C."